June 23, 1959 H. W. BOYLAN 2,891,388
VEHICLE AIR CONDITIONING APPARATUS
Filed March 18, 1955
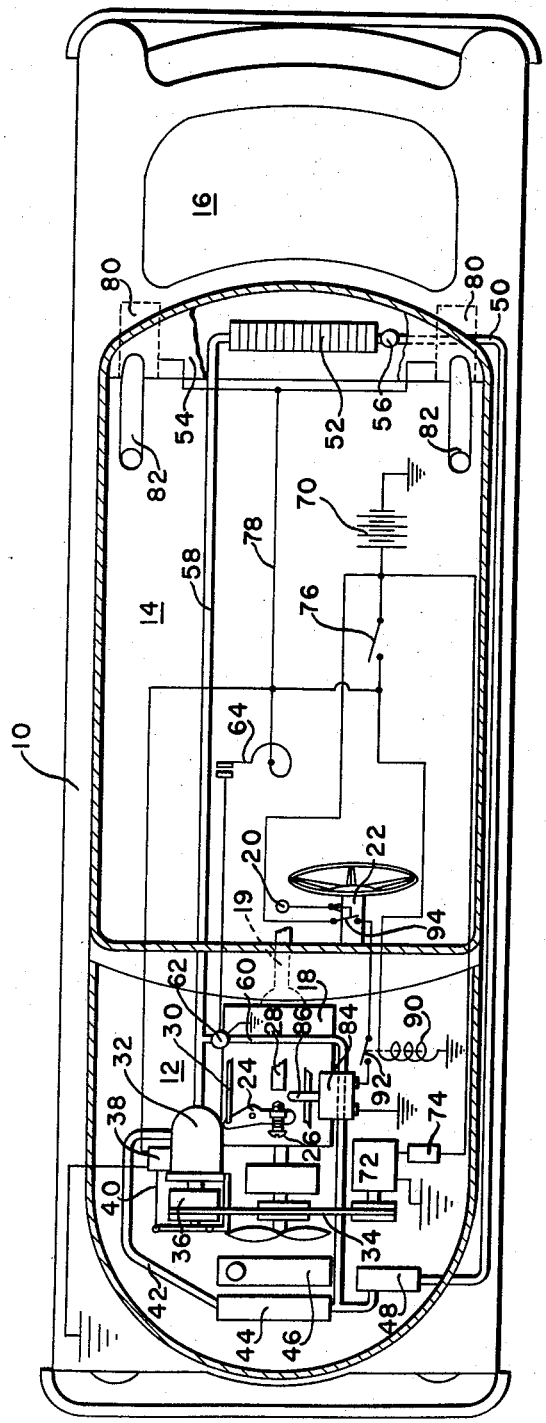
INVENTOR.
Henry W. Boylan
BY
R. R. Candor
His Attorney 2,891,388
Patented June 23, 1959

2,891,388
VEHICLE AIR CONDITIONING APPARATUS

Henry W. Boylan, Flint, Mich., assignor to General Motors Corporation, Detroit, Mich., a corporation of Delaware Application March 18, 1955, Serial No. 495,158

7 Claims. (Cl. 62—243)

This invention relates to refrigerating apparatus and more particularly to an automobile air conditioning system.

Two of the problems in equipping an automobile with an air conditioner are those of preventing discharge of the car battery and providing enough refrigeration when the car is standing still and the air conditioning equipment is in use. The charging rate of the generator may be increased by increasing the speed of the main car engine, but this introduces other problems. Any change in the idling speed of a car having a modern transmission must be made without objectionably increasing the idling speed of the car engine when the shift lever is in one of the driving positions since any appreciable increase in the idling speed of the car engine would tend to cause the car to creep when the shift lever is in a driving position. It is an object of this invention to provide a simple and inexpensive means for increasing the idling speed of the car engine only at such times when the air conditioner is in operation and the shift lever is in the "neutral" or "park" position.

More particularly, it is an object of this invention to provide a solenoid-operated plunger which can move between a part of the throttle lever and the adjustable idling stop for the lever when the air conditioning is turned on and the shift lever is in the "neutral" or "park" position.

Further objects and advantages of the present invention will be apparent from the following description, reference being had to the accompanying drawings, wherein a preferred form of the invention is clearly shown.

The sole figure of the drawing is a plan view, with parts broken away, showing schematically the invention applied to a passenger automobile.

Referring now to the drawing wherein a preferred embodiment of the invention has been diagrammatically illustrated, reference numeral 10 designates a conventional passenger automobile having an engine compartment 12, a passenger compartment 14, and a luggage compartment 16. The usual car engine 18 is arranged in the engine compartment 12 and serves to supply power through the drive shaft 19 for propelling the drive wheels of the car in accordance with conventional practice. The transmission of power from the car engine to the drive wheels is controlled by means of the usual shift lever 20 mounted on the steering column 22 in accordance with standard practice. The car construction thus far described is well known and needs no further description or illustration as anyone skilled in the automobile art will be able to practice the invention on the basis of the disclosure contained herein.

The speed of the engine is adapted to be controlled by means of a conventional throttle lever 24. This lever is provided with an adjustable idling screw 26 adjacent its one end for engagement with a fixed stop 28 which determines the idling speed of the car engine 12 when the throttle is moved to the idling position. A conventional lever 30 is used for actuating the throttle and is adapted to be connected to the usual foot-operated throttle (not shown).

A refrigerant compressor 32 is adapted to be driven by the car engine 18 through the belt means 34 and a solenoid actuated clutch 36. The clutch 36 is controlled by a solenoid 38 which, for purposes of illustration, has been shown mounted on the compressor 32 and provided with an actuator 40 for operating the clutch 36.

The compressor 32 is provided with an outlet line 42 which leads to a refrigerant condenser 44 located in front of the main car engine radiator 46 so as to be cooled by the air flowing through the engine compartment of the car. The condensed refrigerant leaves the condenser 44 and flows into a receiver 48 from whence the liquid refrigerant flows through a line 50 into an evaporator 52 which, for purposes of illustration, has been shown in the luggage compartment 16 of the car directly beneath the package shelf 54. An expansion valve 56 controls the flow of refrigerant into the evaporator 52 in accordance with standard practice. The vaporized refrigerant returns from the evaporator to the condenser through the usual suction line 58.

A by-pass line 60 connects the outlet of the condenser to the inlet of the compressor and is designed to by-pass refrigerant when the refrigerating system has excess capacity. A control valve 62 is provided in the by-pass line and is controlled by a thermostat 64 which is arranged so as to respond to refrigeration requirements. Whenever refrigeration is required, the thermostat 64 will be closed so as to energize the valve 62 and prevent the flow of refrigerant through the by-pass line. The usual car battery 70 is provided as shown and is adapted to be charged by the usual car generator 72. The usual voltage regulator and reverse current relay 74 are provided in the line from the generator 72 to the battery 70.

A master control switch 76 is provided for turning on and off the air conditioning equipment and is so arranged in the circuit that upon closing of the switch 76, current will flow to the clutch operating solenoid 38 so as to cause the compressor to operate and current will also flow from the battery 70 through the line 78 to the air circulating blowers 80. The blowers 80 serve to withdraw air downwardly over the evaporator 52 and to discharge the conditioned air through conventional air discharge tubes 82. Insofar as the broader aspects of this invention are concerned the evaporator and the air circulating blowers could be arranged in any other convenient location other than that shown.

The idling speed of the engine is increased whenever refrigeration is required and the shift lever is in the "neutral" or "park" position by energizing a solenoid 84 which operates a plunger 86 arranged to move between the idling screw 26 and the stop 28. Upon closing the main air conditioning control switch 76, a control solenoid 90 is adapted to be energized so as to close a switch 92 arranged in series with the solenoid 84. A second switch 94 is arranged in series with the switch 92 as shown and is adapted to be closed by the shift lever 20 only when the shift lever 20 is in the "neutral" or "park" position. By virtue of the above described construction and arrangement, it is apparent that the idling speed of the car engine is only increased when the air conditioning equipment is turned on and when the shift lever is in such a position that no power is being transmitted to the drive shaft of the car. This arrangement prevents discharge of the car battery when operating the air conditioner with the car immobile, and increases the cooling capacity of the refrigerating system.

It is obvious that if the solenoid 84 is made powerful enough, the very act of energizing the solenoid will cause the plunger 86 to force its way between the stop 28 and the idling adjusting screw 26 so as to increase the engine speed whereas if a less expensive and less powerful solenoid is used the plunger will not slide into place until the driver opens the throttle enough to allow the plunger to move between the stop 28 and the screw 26. The plunger 86 will then remain in place until the shift lever is placed in one of the forward or reverse drive positions.

While the form of embodiment of the invention as herein disclosed constitutes a preferred form, it is to be understood that other forms might be adopted, as may come within the scope of the claims which follow.

What is claimed is as follows:

1. In combination with a vehicle having an engine for propelling the vehicle and having a passenger compartment to be conditioned, means including a shift lever for controlling the propulsion of said vehicle by said engine, said shift lever having a neutral position in which no power is transmitted from said engine for propelling said vehicle, a refrigerating system including a compressor, a condenser, and an evaporator connected in refrigerant flow relationship, means for circulating air to be conditioned for said passenger compartment in thermal exchange relationship with said evaporator, power transmitting means for transmitting power from said engine to said compressor, throttle means for controlling the idling speed of said engine and for varying the speed of said engine, said last named means including an adjustable means for setting the idling speed of said engine and a solenoid means for changing the idling speed setting of the throttle means to maintain the necessary idling speed when the compressor is connected to said engine, and means responsive to a predetermined movement of said shift lever for preventing the energization of said solenoid means.

2. In combination with a vehicle having an engine for propelling the vehicle and having a passenger compartment to be conditioned, means including a shift lever for controlling the propulsion of said vehicle by said engine, said shift lever having a position in which no power is transmitted from said engine to said vehicle, a source of electrical power, a refrigerating system including a compressor, a condenser, and an evaporator connected in refrigerant flow relationship, means for circulating air to be conditioned for said passenger compartment in thermal exchange relationship with said evaporator, power transmitting means including a clutch between said compressor to said engine, throttle means for controlling the idling speed of said engine, said last named means including solenoid means for partially opening the throttle means to maintain the necessary idling speed in response to engagement of said clutch, circuit means for connecting said air circulating means and said solenoid means to said power source, and switch means in said circuit operable in response to movement of said shift lever for controlling the energization of said solenoid means, said circuit means including a master switch for simultaneously controlling the energization of said solenoid means and said air circulating means.

3. In combination with a vehicle having an engine for propelling the drive wheels of the vehicle and having a passenger compartment to be conditioned, means including a shift lever for controlling the propulsion of said vehicle by said engine, said shift lever having at least one position in which no power is transmitted from said engine to said drive wheels, a refrigerating system including a compressor, a condenser, and an evaporator connected in refrigerant flow relationship, means for circulating air to be conditioned for said passenger compartment in thermal exchange relationship with said evaporator, power transmitting means including a clutch for transmitting power from said engine to said compressor, a throttle for varying the speed of said engine, solenoid means for partially opening said throttle, and means responsive to movement of said shift lever into a given position for controlling the energization of said solenoid means, means for jointly controlling said clutch and said solenoid means, and means for varying the output of said refrigerating system without varying the speed of said engine.

4. In combination with a vehicle having an engine for propelling the vehicle and having a passenger compartment to be conditioned, means including a shift lever movable into one position for causing propulsion of said vehicle by said engine and movable into another position in which said vehicle is not propelled by said engine, a refrigerating system including a compressor, a condenser, and an evaporator connected in refrigerant flow relationship, means for circulating air to be conditioned for said passenger compartment in thermal exchange relationship with said evaporator, power transmitting means including a clutch between said compressor and said engine, means including a throttle for varying the speed of said engine and having a low idling position and a high idling position, solenoid means for moving said throttle from its low idling position to said high idling position, means for simultaneously actuating said solenoid and said clutch, and means responsive to movement of said shift lever for controlling the energization of said solenoid means.

5. In combination with a vehicle having an engine for propelling the vehicle and having a passenger compartment to be conditioned, means including a shift lever movable into one position for causing propulsion of said vehicle by said engine and movable into another position in which said vehicle is not propelled by said engine, a refrigerating system including a compressor, a condenser, and an evaporator connected in refrigerant flow relationship, means for circulating air to be conditioned for said passenger compartment in thermal exchange relationship with said evaporator, power transmitting means including a clutch between said compressor and said engine, means including a throttle for varying the speed of said engine and having a low idling position and a high idling position, solenoid means for moving said throttle from its low idling position to said high idling position, means for simultaneously actuating said solenoid and said clutch, means responsive to movement of said shift lever for controlling the energization of said solenoid means, means for varying the output of said refrigerating system irrespective of changes in the speed of said engine, and means responsive to cooling requirements in said passenger compartment for controlling the operation of said last named means.

6. In combination with a vehicle having an engine for propelling the vehicle and having a passenger compartment to be conditioned, a refrigerating system including a compressor, a condenser, and an evaporator connected in refrigerant flow relationship, means for circulating air to be conditioned for said passenger compartment in thermal exchange relationship with said evaporator, power transmitting means connecting said compressor to said engine, throttle means for varying the speed of said engine, said last named means including a solenoid means for partially opening said throttle means to maintain the necessary idling speed, said throttle means comprising a stop and a lever having a portion normally movable against said stop in the idling position of said engine, said solenoid means comprising a plunger movable between said stop and said lever portion for increasing said idling speed, said solenoid means having insufficient power to separate said lever portion from said stop when said lever portion abutts said stop whereby it is first necessary to momentarily move said throttle portion away from said stop before said plunger can move between said lever portion and said stop.

7. In combination with a vehicle having an engine for propelling the vehicle and having a passenger compartment to be conditioned, a refrigerating system including a compressor, a condenser, and an evaporator connected in refrigerant flow relationship, means for circulating air to be conditioned for said passenger compartment in thermal exchange relationship with said evaporator, power transmitting means connecting said compressor to said engine, throttle means for varying the speed of said engine, said last named means including a solenoid means for partially opening said throttle means to maintain the necessary idling speed, said throttle means comprising a stop and a lever having a portion normally movable against said stop in the idling position of said engine, said solenoid means comprising a plunger movable between said stop and said lever portion for increasing said idling speed, said solenoid means having sufficient strength to force said plunger between said stop and said lever portion so as to automatically increase the idling speed in response to energization of said solenoid means.

References Cited in the file of this patent

UNITED STATES PATENTS

| | | |
|---|---|---|
| 2,070,379 | Stramaglia | Feb. 9, 1937 |
| 2,213,654 | Melcher | Sept. 3, 1940 |
| 2,248,747 | Dick | July 8, 1941 |
| 2,251,376 | Ross | Aug. 5, 1941 |
| 2,257,164 | Enwer | Sept. 30, 1941 |
| 2,264,821 | Zukoski | Dec. 2, 1941 |
| 2,495,993 | Wallace | Jan. 31, 1950 |